United States Patent Office 3,498,974
Patented Mar. 3, 1970

3,498,974
1,1-ALKYLENE HYDRAZINE DERIVATIVES
Ernest Magnien, Flushing, and Wing Tom, Riverdale, N.Y., assignors to U.S. Vitamin & Pharmaceutical Corporation, a corporation of Delaware
No Drawing. Filed Nov. 30, 1966, Ser. No. 597,874
Int. Cl. C07d 41/04, 29/28; A61k 27/00
U.S. Cl. 260—239                                      5 Claims

ABSTRACT OF THE DISCLOSURE

Compounds of the formula

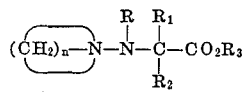

wherein R, $R_1$, $R_2$, and $R_3$ are hydrogen or lower alkyl and $n$ is an integer from 5–7 have potent hypoglycemic activity. The compounds wherein $R_3$ is lower alkyl are obtained by treatment of the corresponding nitrile with the desired alkanol in the presence of an equivalent quantity of water.

---

This invention relates to new organic compounds having valuable pharmacological activity and to processes for the preparation of said compounds. In particular the invention relates to hypoglycemic hydrazines of the following structural formula

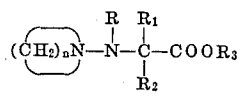

wherein $n$ is an integer from 5–7 inclusive, and R, $R_1$ and $R_2$ are hydrogen or lower alkyl, and may be the same or different, and $R_3$ is hydrogen, lower alkyl or hydroxy lower alkyl, and their pharmaceutically acceptable nontoxic acid addition salts.

Preferably, $n$ is 6, R, $R_1$ and $R_2$ are hydrogen and $R_3$ is methyl or ethyl.

According to a process of the invention the esters are prepared by heating at a temperature above 30° C. a solution of a nitrile of the formula

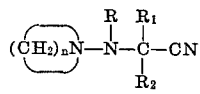

wherein $n$, R, $R_1$ and $R_2$ are the same as above, and at least one equivalent of water in an alcohol of the formula $R_3OH$, wherein $R_3$ is lower alkyl or hydroxy lower alkyl, said alcohol having dissolved therein a mineral acid. The mineral acid is desirably hydrochloric or hydrobromc iacid which is added to the point of saturation to the alcohol as the gaseous hydrogen chloride or hydrogen bromide. In carrying out the reaction it is preferred to add the water to the acidic alcoholic solution of the nitrile.

According to another process of the invention the esters where R is hydrogen are prepared by removing the formyl group from a formyl derivative of the formula

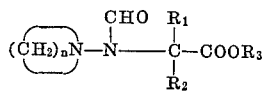

where $n$, $R_1$ and $R_2$ are the same as above and $R_3$ is lower alkyl or hydroxy lower alkyl, by reuxing the formal derivative in dilute anhydrous solution of a mineral acid, preferably hydrogen chloride in an alcohol of the formula $HOR_3$ where $R_3$ is lower alkyl or hydroxy lower alkyl.

In either process the product is isolated from the reaction mixture in the form of a salt from which the free base may be prepared by the addition of an equivalent amount of ammonia. The free basic compound may be used to prepare other pharmaceutically acceptable nontoxic acid addition salts by treatment with a pharmaceutically acceptable non-toxic acid, such as, for example, inorganic acids such as hydrochloric, hydrobromic, sulfuric and phosphoric, organic acids such as acetic, propionic, glycolic, lactic, pyruvic, malonic, succinic, maleic, fumaric, malic, tartaric, citric, ascorbic, benzoic, nicotinic, cinnamic, isonicotinic, aminobenzoic, hydroxybenzoic, aminosalicylic, mandelic, benzenesulfonic, toluenesulfonic and the like.

The free carboxylic acids may be readily obtained by the conventional hydrolysis of the nitrile in an acidic aqueous solution. The nitriles are obtained by treating amino alkyleneimines with glyconitrile or lower alkyl substituted glyconitriles.

The formyl esters are obtained by formylating the hydrazine of the formula

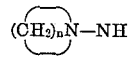

where $n$ is the same as above, and treating the formyl hydrazine with an alkali amide and a halo-carboxylic acid ester of the formula X—$C(R_1)(R_2)$—$COOR_3$, where $n$, $R_1$ and $R_2$ are the same as above and $R_3$ is lower alkyl or hydroxy lower alkyl.

The compound of this invention are potent hypoglycemic agents possessing power to reduce the level of blood glucose in glucose primed rats by 70% at dosages of about 100 mg. per kg. The compounds have an $LD_{50}$ of 1000 or greater, both i.p. and p.o. These properties make these compounds particularly useful in the treatment of diabetes.

EXAMPLE I (a) 2-cyanomethyl-1,1-hexamethylenehydrazine

To 58.0 g. (0.508 mole) of aminohexamethyleneimine was added with stirring 40.0 g. (0.49 mole) of 70% glycolonitrile. An exothermic reaction resulted which raised the temperature from 25° to 48°. The mixture was then heated over ½ hour to 80° after which another exothermic reaction took place raising the temperature to 92°. The mixture was then rapidly cooled and distilled to yield 58.7 g. of a pale yellow product of B.P. 90–96° (0.3 mm.).

(b) 2-carbethoxymethyl-1,1-hexamethylenehydrazine hydrobromide

A solution of 40 g. (0.26 mole) of 2-cyanomethyl-1,1-hexamethylenehydrazine in 500 ml. of absolute ethanol was saturated with HCl while maintaining the temperature between 0–5°. Five ml. of water was added to the solution and stirring was maintained for 24 hrs. at 30–35°. A white solid ($NH_4Cl$, 13.3 g.) was filtered off and the filtrate was evaporated in vacuo. The residue was basified with concentrated $NH_4OH$ and extracted with ether. The ether exratcts were dried over $MgSO_4$ and filtered. The ether was removed in vacuo and the residue was dissolved in anhydrous ether. Excess HBr caused precipitation of the crude HBr salt (33.0 g., 45%). Three crystallizations from acetone gave the pure product having a M.P. of 109–110°.

EXAMPLE II 2-carboxymethyl-1,1-hexamethylenehydrazine hydrobromide

To 70 ml. of 24% hydrobromic acid, was added 5.5 g. (0.36 mole) of 2-cyanomethyl-1,1-hexamethylene hydrazine. The solutiton was refluxed for 3 hrs. and then concentrated to a small volume in vacuo. On cooling, a white solid (NH$_4$Br 3.0 g.) separated and was filtered off. The filtrate was evaporated to dryness and the solid residue was slurried with isopropanol and filtered to give 4.2 of M.P. 136–146° (46%). Recrystallization from isopropanol gave a product of M.P. 163–165° dec.

EXAMPLE III

2-carbethoxymethyl-2-methyl-1,1-hexamethylene-hydrazine hydrochloride

A solution of 43 g. (0.258 mole) of 2-cyanomethyl-2-methyl-1,1-hexamethylene-hydrazine in 180 ml. of absolute ethanol was treated according to the procedure of Example I as above to yield 2.5 g. of material of M.P. 176–178°.

EXAMPLE IV

2-carbomethoxymethyl-1,1-hexamethylene-hydrazine hydrochloride

A solution of 18 g. (0.118 mole) of 2-cyanomethyl-1,1-hexamethylenehydrazine in 170 ml. of dry methanol was saturated with HCl while maintaining the temperature between 0–5°. The solution was stirred for 1.5 hr. at 25° after which 3.0 ml. of water was added and the solution was refluxed for 1 hr. After cooling and filtering from NH$_4$Cl (4.8 g.), the solution was evaporated to dryness in vacuo. The crude residue was crystallized from methanol-ether to yield 12.0 g. of M.P. 158–160° dec. Recrystallization from isopropanol-ether gave 8.4 g. of M.P. 161–163°.

EXAMPLE V

(a) 2-formly-1,1-hexamethylenehydrazine

A solution of 214.6 g. (1.88 mole) of aminohexamethyleneimine and 146 g. (244 mole) of methyl formate in 150 ml. of methanol was refluxed for 6 hrs. The solvent was removed in vacuo and the product distilled to yield 231.5 g. (86%) of product of B.P. 92–106°/0.03 mm.

(b) 2-carbethoxymethyl-2-formyl-1,1-hexamethylene-hydrazine

To a suspension of 8 g. (0.2 mole) of sodium amide in 210 ml. of toluene was added with stirring 284 g. (0.2 mole) of 2-formyl-1,1-hexamethylenehydrazine. The temperature was maintained around 100° for 0.5 hr. during which time most of the ammonia had evolved. The suspension was then refluxed for 2 hrs. The mixture was then cooled to 0° and 33.4 g. (0.2 mole) of ethyl bromoacetate was added dropwise while the temperature was maintained at 0–10°. After one hour the suspension was allowed to come to 25°. Sodium bromide was filtered off after 16 hrs. and the solvent was removed in vacuo. The residue was distilled to yield 37 g. (81%) of product of B.P. 130–141°/0:05 mm.

(c) 2-carbethoxymethyl-1,1-hexamethylenehydrazine hydrochloride

A solution of 34.2 g. (0.150 mole) of 2-carbethoxymethyl-2-formyl-1,1-hexamethylenehydrazine in 350 ml. of anhydrous 1 normal HCl in ethanol was refluxed 0.5 hr. The solvent was removed in vacuo and the residue was triturated with anhydrous ether and filtered to yield 35.5 g. of product of M.P. 75–83°. Crystallization from acetone gave 28 g. of product having a M.P. of 94–95°. On recrystallization it melted at 108–110°.

Following procedures the following compounds were prepared:

| | | Compound | | | | |
|---|---|---|---|---|---|---|
| n | R | R$_1$ | R$_2$ | R$_3$ | HX | M.P., deg. |
| 5 | H | H | H | C$_2$H$_5$ | HCl | 110–112 |
| 6 | H | CH$_3$ | H | CH$_3$ | HBr | 105–106 |
| 6 | H | H | H | n-C$_3$H$_7$ | (COOH)$_2$ | 80–82 |
| 6 | H | H | H | n-C$_4$H$_9$ | HCl | 113–116 |
| 7 | H | H | H | CH$_3$ | HBr | 117–1220 |

What is claimed is:
1. A compound selected from the group consisting of compounds having the structural formula

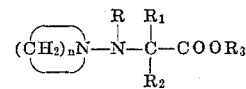

wherein $n$ is an integer from 5 to 7 inclusive and R, R$_1$, R$_2$ and R$_3$ are hydrogen or lower alkyl and their pharmaceutically acceptable non-toxic acid addition salts.

2. A compound according to claim 1, wherein $n$ is 6.

3. A compound according to claim 2, wherein the acid addition salt is the hydrochloride or hydrobromide.

4. A compound according to claim 3, wherein R, R$_1$, and R$_2$ are hydrogen and R$_3$ is methyl.

5. A compound according to claim 3, wherein R, R$_1$ and R$_2$ are hydrogen and R$_3$ is ethyl.

References Cited

Wagner et al.: Synthetic Organic Chemistry, Wiley, 1953, p. 679.

Morrison et al.: Organic Chemistry, Allyn & Bacon, 1959, pp. 456, 481, 441.

ALEX MAZEL, Primary Examiner

R. V. RUSH, Assistant Examiner

U.S. Cl. X.R.

260—294.3, 999